United States Patent
Woo et al.

(10) Patent No.: US 10,018,093 B2
(45) Date of Patent: Jul. 10, 2018

(54) VEHICULAR EXHAUST DEVICE

(71) Applicant: Hyundai Motor Company, Seoul (KR)

(72) Inventors: Soo Hyung Woo, Yongin-si (KR); Woo Tae Kim, Anyang-si (KR); Dae Sung Kim, Hwaseong-si (KR); Byeong Seok Lee, Hwaseong-si (KR); Seung Kook Han, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 38 days.

(21) Appl. No.: 15/257,229

(22) Filed: Sep. 6, 2016

(65) Prior Publication Data

US 2017/0130631 A1 May 11, 2017

(30) Foreign Application Priority Data

Nov. 6, 2015 (KR) .......................... 10-2015-0155812

(51) Int. Cl.
| | | |
|---|---|---|
| *F01N 3/02* | (2006.01) | |
| *F01N 3/10* | (2006.01) | |
| *F01N 3/28* | (2006.01) | |
| *F01N 3/08* | (2006.01) | |
| *F01N 3/20* | (2006.01) | |
| *F01N 13/08* | (2010.01) | |
| *F01N 13/10* | (2010.01) | |
| *F01N 13/18* | (2010.01) | |

(52) U.S. Cl.
CPC ................ *F01N 3/28* (2013.01); *F01N 3/08* (2013.01); *F01N 3/2006* (2013.01); *F01N 13/08* (2013.01); *F01N 13/107* (2013.01); *F01N 13/1805* (2013.01); *F01N 2240/02* (2013.01); *F01N 2260/08* (2013.01); *F01N 2470/00* (2013.01); *Y02T 10/26* (2013.01)

(58) Field of Classification Search
CPC . F01N 3/28; F01N 3/08; F01N 3/2006; F01N 13/08; F01N 13/107; F01N 13/1805; F01N 2240/02; F01N 2260/08; F01N 2470/00; Y02T 10/26
USPC .......................................................... 60/320
See application file for complete search history.

(56) References Cited

U.S. PATENT DOCUMENTS

| | | | | |
|---|---|---|---|---|
| 3,197,287 A | * | 7/1965 | Innes et al. ............... | F01N 3/22 422/181 |
| 6,332,314 B1 | * | 12/2001 | Nakade ................. | F01N 3/2882 60/299 |
| 2012/0192557 A1 | * | 8/2012 | Johnson ................ | F01D 17/105 60/599 |

FOREIGN PATENT DOCUMENTS

| | | |
|---|---|---|
| JP | H06-073318 U | 10/1994 |
| JP | 4434401 B2 | 1/2010 |
| KR | 10-1996-0041640 | 12/1996 |
| KR | 10-2004-0033882 A | 4/2004 |
| KR | 10-2009-0111183 | 10/2009 |
| KR | 10-2011-0021441 | 3/2011 |

* cited by examiner

*Primary Examiner* — Laert Dounis
*Assistant Examiner* — Kelsey Stanek
(74) *Attorney, Agent, or Firm* — Brinks Gilson & Lione

(57) ABSTRACT

A vehicular exhaust device is disclosed. The vehicular exhaust device includes an exhaust pipe, which is connected at one end to an exhaust manifold of a cylinder and at the other end to a catalytic converter. In particular, an intermediate portion of the exhaust pipe is in contact with the side surface of the catalytic converter so as to heat the catalytic converter by heat of the exhaust pipe.

7 Claims, 4 Drawing Sheets

VEHICULAR EXHAUST DEVICE

CROSS-REFERENCE TO RELATED APPLICATION

This application claims priority to and the benefit of Korean Patent Application No. 10-2015-0155812, filed on Nov. 6, 2015, which is incorporated herein by reference in its entirety.

FIELD

The present disclosure relates to a vehicular exhaust device.

BACKGROUND

The statements in this section merely provide background information related to the present disclosure and may not constitute prior art.

A typical vehicular engine, which is an internal-combustion engine, is provided with an exhaust system for the discharge of exhaust gas generated by burning fuel in a cylinder.

A cylinder head is provided therein with an exhaust port so as to allow exhaust gas in the cylinder to be discharged through the exhaust port. The exhaust gas discharged from the exhaust port is supplied to a catalytic converter through an exhaust manifold and an exhaust pipe.

Recently, in order to reduce exhaust interference, an exhaust pipe is elongated so as to have a sufficient length. However, this construction increases the light-off time (LOT), which is taken to reach the activation temperature of a catalyst in order to purify exhaust gas when an engine is started up at a low temperature, thereby degrading the capability of satisfying the exhaust gas emission standard. Furthermore, a measure of increasing the content of noble metals contained in the catalytic converter in order to improve the capability causes excessive increase in manufacturing costs.

SUMMARY

The present disclosure provides a vehicular exhaust device in which an exhaust pipe partially contacts a catalytic converter so as to reduce the time taken to reach the activation temperature to thus increase purification efficiency.

The present disclosure provides a vehicular exhaust device including an exhaust pipe, which is connected at one end thereof to an exhaust manifold of a cylinder and at the other end thereof to a catalytic converter, and an intermediate portion of the exhaust pipe is in contact with the side surface of the catalytic converter.

The intermediate portion of the exhaust pipe may be curved so as to surround the side surface of the catalytic converter, which has a cylindrical shape, in the state of being arranged around the side surface thereof.

The cylinder block may include a plurality of cylinders.

The number of exhaust manifolds may be smaller than the number of cylinders, and first ends of the exhaust manifolds may be branched so as to be respectively connected to the plurality of cylinders such that the cylinder connected to one of the exhaust manifolds is different from the cylinders connected to the remaining exhaust manifolds, wherein the exhaust pipe includes a plurality of exhaust pipes and the exhaust manifold includes a plurality of exhaust manifolds such that the number of exhaust pipes is the same as the number of exhaust manifolds, and first ends of the exhaust pipes are connected to second ends of different exhaust manifolds and second ends of the exhaust pipes are combined with each other, the combined end being connected to a first end of the catalytic converter.

First ends of the exhaust manifolds may be branched and extend by the same length, and the branched ends of the exhaust manifolds may be connected to respective ones among the plurality of cylinders.

The exhaust manifold may be integrally formed in the cylinder head.

The exhaust manifold may be coupled to a portion of the cylinder head.

The exhaust pipe may be integrally formed with the catalytic converter.

According to the vehicular exhaust device, which is constructed as described above, the light-off time (LOT), which is taken to activate a catalytic converter when a vehicle is started up at a low temperature, is decreased, thereby increasing exhaust gas purification efficiency.

Furthermore, since there is no need to increase the content of noble metal contained in a catalytic converter in order to increase the purification efficiency, it is possible to remarkably reduce manufacturing costs.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
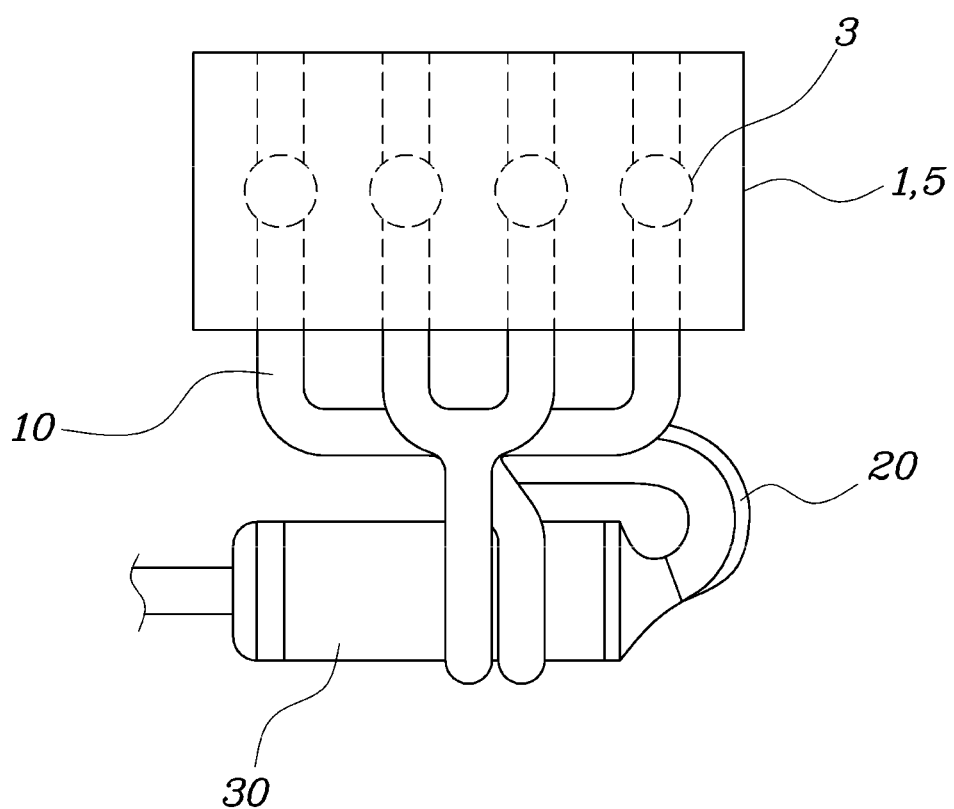
FIG. 1 is a view showing a vehicular exhaust device.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 is a view showing the vehicular exhaust device according to one form of the present disclosure. Referring to FIG. 1, the vehicular exhaust device may include an exhaust pipe 20, which is connected at one end thereof to an exhaust manifold 10 and at the other end thereof to a catalytic converter 30. The exhaust pipe 20 is also in contact at an intermediate portion 40 thereof with the side surface of the catalytic converter 30.

A cylinder block 5 is provided therein with a cylinder, which provides space for burning fuel, and a cylinder head 1 connected with the cylinder block 5 is provided therein with the exhaust manifold 10, which serves as a channel through which gas, resulting from burning of the fuel in the cylinder 3, is discharged to the outside. The exhaust manifold 10 is connected at a first end thereof to the cylinder 3 and at a second end thereof to the exhaust pipe 20.

The exhaust pipe 20 is connected at one end thereof to the exhaust manifold 10 and at the other end thereof to the catalytic converter 30 for purifying exhaust gas. In other words, the catalytic converter 30 receives exhaust gas which is discharged through the exhaust manifold 10 and the exhaust pipe 20.

The catalytic converter 30 serves to purify hydrocarbons, which are the undesirable compound in exhaust gas. The purification of hydrocarbon is efficiently implemented at a temperature of about 200 to 350° C. However, if the catalytic converter 30 is not in the state of being sufficiently heated and activated because a vehicle is started up at a low temperature, unburned hydrocarbon may be discharged into the atmosphere without purification by the catalytic converter 30, thereby it may not satisfy exhaust gas emission standards.

Accordingly, the present disclosure in one form provides an intermediate portion 40 of the exhaust pipe 20 that is in contact with the side surface of the catalytic converter 30 so as to reduce the light-off time (LOT) which is the time taken by the catalytic converter 30 to reach the activation temperature. In another form, the intermediate portion 40 of the exhaust pipe 20 may be disposed close to the side surface of the catalytic converter 30 so that the catalytic converter 30 receives heat generated from the exhaust pipe 20. In other words, since high-temperature exhaust gas discharged from the cylinder 3 indirectly heats the catalytic converter 30 while the exhaust gas passes through the exhaust pipe 20. As a result, it is possible to reduce the time taken to increase the temperature of the catalytic converter 30 to the activation temperature.

With these or similar arrangements, the LOT desired to activate the catalytic converter 30 may be shorten even when a vehicle is started, and it is possible to increase the exhaust gas purification efficiency. Advantageously, since there is no need to increase the content of noble metal contained in the catalytic converter 30 in order to increase the purification efficiency, it is possible to remarkably reduce manufacturing costs.

In one form, the intermediate portion 40 of the exhaust pipe 20 is curved so as to surround the side surface of the catalytic converter 30, which has a cylindrical shape, in the state of contacting the side surface thereof.

In other words, the exhaust pipe 20 extends from the exhaust manifold 10 so as to surround the outer surface of the catalytic converter 30, whereby the contact area between the exhaust pipe 20 and the catalytic converter 30 is increased, thereby further increasing the temperature of the catalytic converter 30. Here, the contact surface between the catalytic converter 30 and the exhaust pipe 20 may be a curved surface.

If the catalytic converter 30 has a rectangular section, the intermediate portion 40 of the exhaust pipe 20 may be bent at a right angle so as to closely surround the catalytic converter 30. In other words, the exhaust pipe 20 may have a complimentary shape to maintain the contact or reduce a gap between the exhaust pipe 20 and the catalytic converter 30.

The number of the exhaust manifolds 10 may be fewer than the number of cylinders 3. With this arrangement, each of the exhaust manifolds 10 may be branched at a first end thereof and is connected to a corresponding cylinder 3 such one or more cylinders 3 may be connected to one exhaust manifold 10. However, the cylinder(s) connected to one of the exhaust manifolds 10 is not connected to other remaining exhaust manifolds 10. Meanwhile, the number of the exhaust pipes 20 may be same as the number of the exhaust manifolds 10, and thus each of the exhaust pipes 20 is connected at first ends thereof to the second end of the corresponding exhaust manifold 10, and the exhaust pipes 20 are combined with each other at second ends thereof. The combined end of the exhaust pipes 20 is connected to the first end of the catalytic converter 30.

Figure 2:
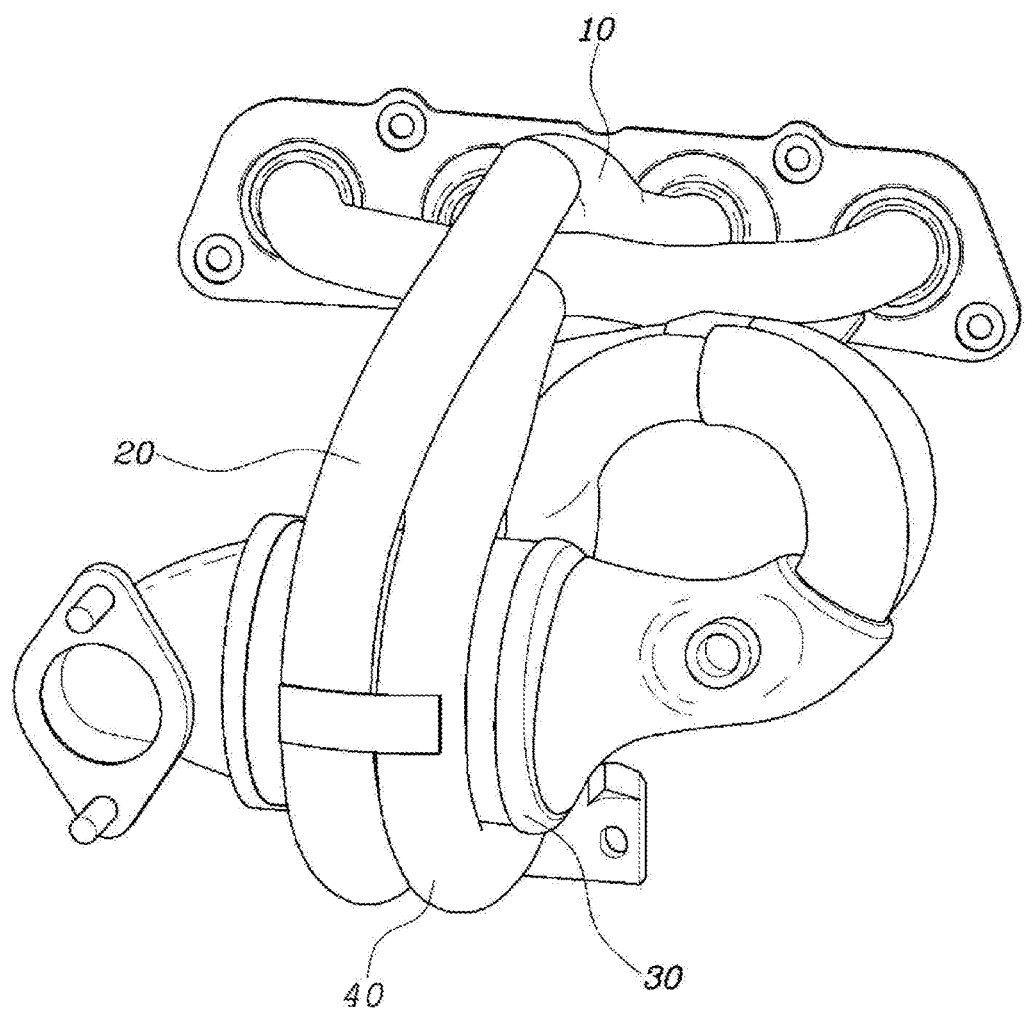
FIG. 2 is a schematic perspective view showing the vehicular exhaust device.
Figure 3:
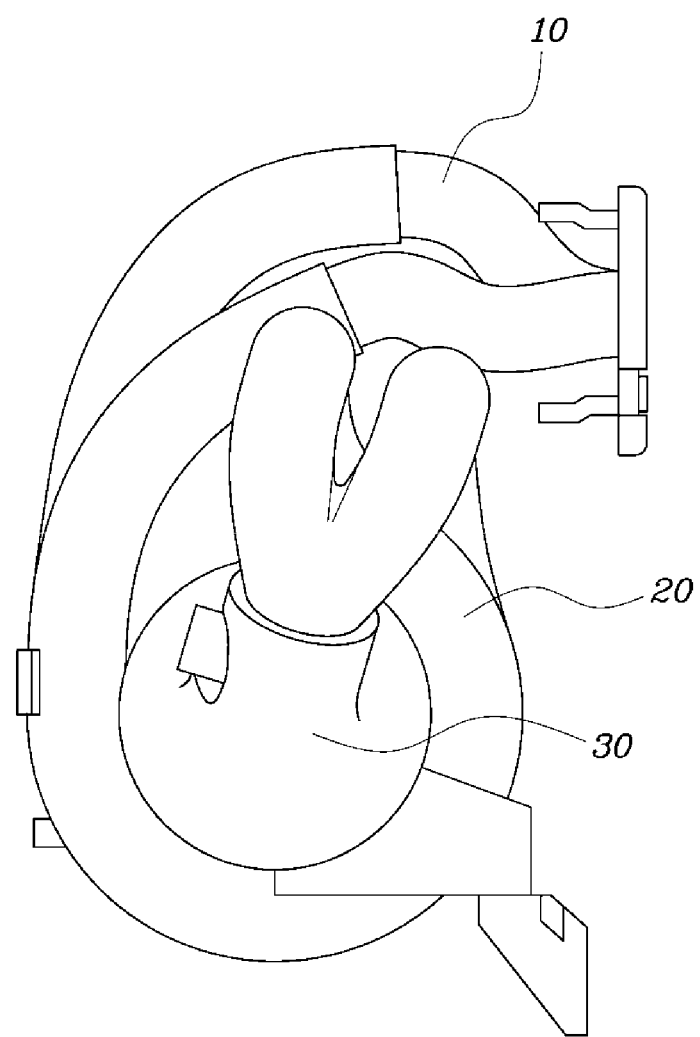
FIG. 3 is a side view showing the vehicular exhaust device.

FIG. 2 is a perspective view showing the vehicular exhaust device according to one form of the present disclosure. FIG. 3 is a side view showing the vehicular exhaust device. Referring to FIGS. 2 and 3, in the case where there are four cylinders 3 and two exhaust manifolds 10, one of the two exhaust manifolds 10 may be connected to the first and fourth cylinders and the other exhaust manifold 10 may be connected to the second and third cylinders. In other words, cylinders 3 that do not consecutively execute expansion strokes are connected to each other, thereby reducing exhaust interference.

In the case where six cylinders 3 and two or three exhaust manifolds 10 are provided, each of the exhaust manifolds 10 is connected to cylinders 3 that do not consecutively execute expansion strokes, thereby inhibiting or preventing exhaust interference. Here, the numbers of cylinders 3 and exhaust manifolds 10 are suggested merely for illustrative purpose, and may be changed depending on a designer or a vehicle.

Accordingly, since there is no need to provide a number of manifolds 10 as many as the number of cylinders 3, it is possible to provide a compact package including the exhaust device, without an excessive number of exhaust manifolds 10.

The exhaust manifolds 10 may be branched at the first ends and may extend by the same length, and the branched ends may be connected to corresponding cylinders 3. In other words, one exhaust manifold 10 may diverge into several branches so that one exhaust manifold 10 may be connected several cylinders. Specifically, the pressures of exhaust gas discharged from respective cylinders 3 become equal to each other when the branched ends of the exhaust manifolds 10 extend by the same length. The length may be measured from the point at which the manifolds 10 are connected to the exhaust pipe 20 to the point at which the branched ends of the exhaust manifolds 10 are connected to the respective cylinders. Therefore, the branched ends of the exhaust manifolds 10 extend by the same length with respect to the midpoint of the cylinders 3, thereby inhibiting or preventing the occurrence of exhaust interference in the exhaust manifolds 10.

The exhaust manifolds 10 may be configured to be coupled to one end of the cylinder head 1, as shown in FIGS. 2 and 3, or may be configured to be integrally formed in the cylinder head 1.

Figure 4:
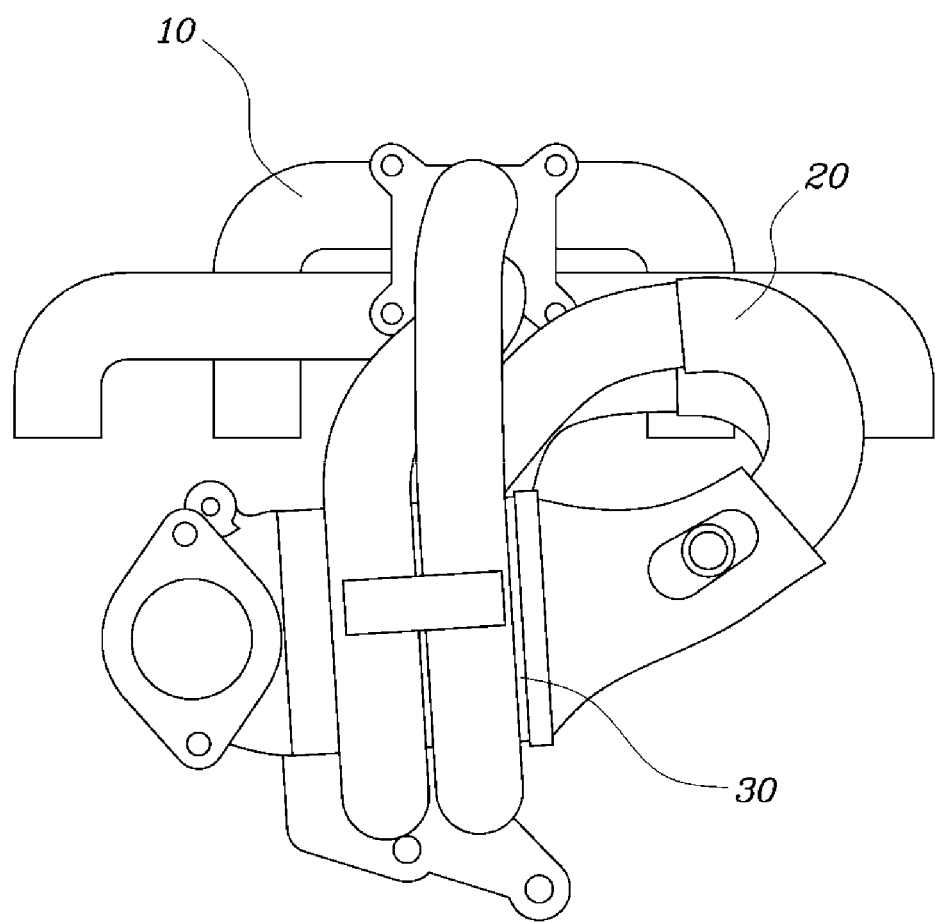
FIG. 4 is a perspective view showing a vehicular exhaust device.

FIG. 4 is a perspective view showing a vehicular exhaust device according to another form of the present disclosure. Referring to FIG. 4, it will be noted that an exhaust manifold 10 is provided in the cylinder head. Consequently, the construction of the package including the exhaust device may be simplified, and the volume thereof may be reduced.

The exhaust pipes 20 may be integrally formed with the catalytic converter 30. Specifically, although the exhaust pipes 20 may be coupled to the catalytic converter 30 by means of bolts, the exhaust pipes 20 may be integrally formed with the catalytic converter 30 in order to reduce the outflow of exhaust gas and the volume of the device.

According to the present disclosure, the light-off time (LOT), which is taken to activate a catalytic converter when a vehicle is started up at a low temperature, is reduced, thereby increasing exhaust gas purification efficiency.

Furthermore, since there is no need to increase the content of noble metal contained in a catalytic converter in order to increase the purification efficiency, it is possible to remarkably reduce manufacturing costs.

Although forms of the present disclosure has been described for illustrative purposes, those skilled in the art will appreciate that various modifications, additions and substitutions are possible, without departing from the scope and spirit of the present disclosure.

What is claimed is:

1. A vehicular exhaust device comprising:
   a cylinder block including a plurality of cylinders;
   two or more exhaust manifolds each including a first end and a second end; and
   two or more exhaust pipes each including a first end, a second end, and an intermediate portion forming a body portion connecting the first end and the second end, wherein the first ends of the exhaust pipes are respectively connected to the corresponding second ends of the exhaust manifolds and the second ends of the exhaust pipes are connected to a catalytic converter, the intermediate portion configured to contact with a side surface of the catalytic converter,
   wherein a number of the exhaust manifolds is less than a number of the cylinders, and the exhaust manifolds are branched at the first ends thereof and extended by a predetermined length so as to be respectively connected to the corresponding cylinder of the plurality of cylinders,
   wherein a number of the exhaust pipes is the same as the number of the exhaust manifolds, the second ends of the exhaust pipes are combined with each other, and the combined second ends of the exhaust pipes are connected to a first end of the catalytic converter, and
   wherein the predetermined extension lengths of the exhaust manifolds are all equal.

2. The vehicular exhaust device according to claim 1, wherein the intermediate portions of the two or more exhaust pipes are curved so as to surround the side surface of the catalytic converter so that the intermediate portions form a cylindrical shape.

3. The vehicular exhaust device according to claim 1, wherein the two or more exhaust manifolds are integrally formed in the cylinder head.

4. The vehicular exhaust device according to claim 1, wherein the two or more exhaust manifolds are coupled to a portion of the cylinder head.

5. The vehicular exhaust device according to claim 1, wherein the two or more exhaust pipes are integrally formed with the catalytic converter.

6. The vehicle exhaust device of claim 1, wherein the predetermined extension lengths are measured from a point at which the two or more exhaust manifolds are respectively connected to the two or more exhaust pipes to a point at which the extended first ends of the exhaust manifolds are connected to the respective cylinders.

7. A vehicular exhaust device comprising:
   a plurality of exhaust manifolds mounted on a cylinder head attached on a cylinder block including a plurality of cylinders; and
   a plurality of exhaust pipes each in communication with the corresponding exhaust manifolds and configured to discharge exhaust gas, each of the exhaust pipes including a first end portion, an intermediate portion, and a second end portion,
   wherein the first end portions of the exhaust pipes are respectively connected to the corresponding exhaust manifolds, the second end portions of the exhaust pipes are linked to a catalytic converter, and the intermediate portions of the exhaust pipes are curved and configured to wrap the catalytic converter so that heat generated from the intermediate portions transfers to the catalytic converter,
   wherein each of the exhaust manifolds are diverged into at least two branches and extended by a predetermined length so as to be respectively connected to the corresponding cylinders, and
   wherein the predetermined extension lengths of the branches are all equal.

* * * * *